United States Patent
Hirose et al.

(10) Patent No.: US 6,171,497 B1
(45) Date of Patent: *Jan. 9, 2001

(54) HIGHLY PERMEABLE COMPOSITE REVERSE OSMOSIS MEMBRANE

(75) Inventors: Masahiko Hirose; Tomomi Ohara; Masaaki Ando, all of Shiga (JP)

(73) Assignee: Nitto Denko Corporation, Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/786,628

(22) Filed: Jan. 21, 1997

(30) Foreign Application Priority Data

Jan. 24, 1996 (JP) .................................................. 8-010138
Feb. 5, 1996 (JP) .................................................. 8-018704

(51) Int. Cl.$^7$ .................................................. B01D 71/56
(52) U.S. Cl. ................ 210/500.38; 210/490; 210/321.6; 210/321.74; 210/321.75
(58) Field of Search .................... 210/500.38, 500.39, 210/490, 500.27, 321.6, 321.74, 321.75; 264/48, 49

(56) References Cited

U.S. PATENT DOCUMENTS

| | | | |
|---|---|---|---|
| 4,262,041 | 4/1981 | Eguchi et al. | 427/245 |
| 4,277,344 | 7/1981 | Cadotte | 210/654 |
| 4,337,154 | 6/1982 | Fukuchi et al. | 210/490 |
| 4,360,434 | 11/1982 | Kawaguchi et al. | 210/500.2 |
| 4,520,044 | 5/1985 | Sundet | 427/244 |
| 4,604,208 | 8/1986 | Chu et al. | 210/636 |
| 4,707,265 | 11/1987 | Barnes, Jr. et al. | 210/638 |
| 4,758,343 | 7/1988 | Sasaki et al. | |
| 4,772,394 | 9/1988 | Swedo et al. | 210/500 |
| 4,792,404 | 12/1988 | Swedo et al. | 210/654 |
| 4,830,885 | 5/1989 | Tran et al. | 427/245 |
| 4,872,984 | 10/1989 | Tomaschke | 210/500.38 |
| 4,888,115 | 12/1989 | Marinaccio et al. | 210/636 |
| 4,950,404 | 8/1990 | Chau | 210/500 |
| 4,960,518 | 10/1990 | Cadotte et al. | 210/639 |
| 5,015,382 | 5/1991 | Sundet | 210/490 |
| 5,051,178 | 9/1991 | Uemura et al. | 210/500.38 |
| 5,069,945 | 12/1991 | Wrasidlo | 427/245 |
| 5,152,901 | 10/1992 | Hodgdon | 210/654 |
| 5,215,692 | * 6/1993 | Hörl et al. | 264/48 |
| 5,234,598 | 8/1993 | Tran et al. | 210/654 |
| 5,271,843 | 12/1993 | Chau et al. | 210/654 |
| 5,576,057 | 11/1996 | Hirose et al. | 427/245 |
| 5,614,099 | * 3/1997 | Hirose et al. | 210/500.38 |

FOREIGN PATENT DOCUMENTS

| | | |
|---|---|---|
| 0 015 149 | 9/1980 | (EP) . |
| 0 498 596 | 8/1992 | (EP) . |
| 0 718 029 | 6/1996 | (EP) . |
| 0 718 030 | 6/1996 | (EP) . |
| 61-263602 | 11/1986 | (JP) . |
| 62-121603 | 6/1987 | (JP) . |
| 62-266103 | 11/1987 | (JP) . |
| 63-012310 | 1/1988 | (JP) . |
| 63-054905 | 3/1988 | (JP) . |
| 63-130105 | 6/1988 | (JP) . |
| 63-218208 | 9/1988 | (JP) . |
| 1-180208 | 7/1989 | (JP) . |
| 4-341334 | 11/1992 | (JP) . |
| 5-096141 | 4/1993 | (JP) . |
| 5-309237 | 11/1993 | (JP) . |
| 7-008770 | 1/1995 | (JP) . |
| 8402648 | 3/1986 | (NL) . |

OTHER PUBLICATIONS

Philip A. Schweitzer, Handbook of Separation Techniques for Chemical Engineers.*
European Search Report, Apr. 23, 1998.

* cited by examiner

*Primary Examiner*—Ana Fortuna
(74) *Attorney, Agent, or Firm*—Akin, Gump, Strauss, Hauer & Feld, L.L.P.

(57) ABSTRACT

A module that can be practically used at a pressure of about 3 kgf/cm$^2$ is obtained by treating a polyamide based reverse osmosis membrane with an oxidizing agent. A composite reverse osmosis membrane comprises a thin film which is a polyamide based skin layer obtained by polycondensation of a compound having two or more reactive amino groups and a polyfunctional acid halide compound having two or more reactive acid halide groups, and a microporous support for supporting the thin film. The polyamide based skin layer formed on the surface of the membrane has a mean roughness of 50 nm or more. The composite reverse osmosis membrane is treated with an oxidizing agent. A salt rejection of 99% or more and a flux of 1.5 m$^3$/m$^2$·day or more are obtained when evaluated by using a solution having pH 6.5 containing 500 ppm of sodium chloride at an operating pressure of 7.5 kgf/cm$^2$ and a temperature of 25° C.

34 Claims, No Drawings

HIGHLY PERMEABLE COMPOSITE REVERSE OSMOSIS MEMBRANE

FIELD OF THE INVENTION

The present invention relates to a composite reverse osmosis membrane for selectively separating components in a liquid mixture, and more particularly to a composite reverse osmosis membrane having a high salt rejection and a high flux, comprising an active layer or a skin layer referred to as a thin film that mainly contains polyamide. Such a composite reverse osmosis membrane is preferably used for many purposes such as production of ultrapure water and desalination of sea water or brackish water. This membrane can also be used to remove and withdraw contamination source or effective materials from contamination which is the cause of pollution, for example, dyeing baths or electrochemical deposition coating waste. The contaminated water can be cleaned for reuse. Furthermore, it is possible to condense effective components for food and to remove harmful matters for purified water and sewage.

By using such a composite reverse osmosis membrane, operation can be performed at an ultralow pressure which cannot be pratically performed by using a composite reverse osmosis membrane according to the prior art, and the composite reverse osmosis membrane has a high salt rejection performance. Consequently, it is very excellent in economy. For example, the composite reverse osmosis membrane can also be utilized as a domestic water purifier.

BACKGROUND OF THE INVENTION

Conventionally, a composite reverse osmosis membrane, which is obtained by forming an active skin layer substantially having selective separating properties on a microporous support, has been known as a reverse osmosis membrane whose structure is different from that of an assymmetric reverse osmosis membrane.

There have been composite reverse osmosis membranes in which a skin layer comprising polyamide obtained by interfacial polycondensation of polyfunctional aromatic amine and polyfunctional aromatic acid halide is formed on a support (for example, Japanese Laid-Open Patent Publication Nos. 55-147106, 62-121603 and 63-218208, Japanese Patent Publication No. 6-73617, and the like).

The composite reverse osmosis membranes described above have a high desalination performance and a high flux performance. However, it has been desirable that the composite reverse osmosis membranes should further improve the flux performance while keeping a high desalination performance in respect of a reduction in operation and equipment costs, efficiency and the like. For these requirements, various additives have been proposed (for example, Japanese Laid-Open Patent Publication No. 63-12310), which have improved performance but are insufficient. Furthermore, after-treatment of the composite reverse osmosis membrane performed by using chlorine and the like has also been proposed (for example, Japanese Laid-Open Patent Publication Nos. 63-54905 and 1-180208).

However, the reverse osmosis membrane according to the prior art has a salt rejection of 98.9% and a flux of 2.2 $m^3/m^2 \cdot day$ at an operating pressure 15 $kgf/cm^2$ as an example of the highest flux. When operation is performed at a pressure of 7.5 $kgf/cm^2$, the flux is reduced to about half and the salt rejection is considerably lowered. For this reason, the reverse osmosis membrane could not be practically used at a pressure of 7.5 $kgf/cm^2$. Moreover, the flux was rarely obtained at a pressure of about 3 $kgf/cm^2$. Therefore, the reverse osmosis membrane could not be used. Accordingly, a composite reverse osmosis membrane having a high desalination performance at a low pressure has been required with respect to economy.

SUMMARY OF THE INVENTION

In order to solve the above-mentioned problems, it is an object of the present invention to provide a composite reverse osmosis membrane having a high salt rejection and a high flux performance. In particular, it is an object of the present invention to provide a composite reverse osmosis membrane which can be practically used at a low pressure of about 3 $kgf/cm^2$ or less.

In order to achieve the above-mentioned object, a highly permeable composite reverse osmosis membrane of the first aspect of the present invention comprises a thin film, and a microporous support for supporting the thin film, wherein the thin film is a polyamide based skin layer obtained by polycondensation of a compound having two or more reactive amino groups and a polyfunctional acid halide having two or more reactive acid halide groups. The roughness of the polyamide based skin layer on the surface of the composite reverse osmosis membrane is 50 nm or more. The composite reverse osmosis film is treated with an oxidizing agent and provides a salt rejection of 99% or more and a flux of 1.5 $m^3/m^2 \cdot day$ or more, when evaluated by using a solution having pH 6.5 containing 500 ppm of sodium chloride at an operating pressure of 7.5 $kgf/cm^2$ and a temperature of 25° C.

Next, a highly permeable composite reverse osmosis membrane of the second aspect of the present invention comprises a high permeable composite reverse osmosis membrane comprising a thin film, and a microporous support for supporting the thin film, wherein the thin film is a polyamide based skin layer obtained by polycondensation of a compound having two or more reactive amino groups and a polyfunctional acid halide having two or more reactive acid halide groups. The specific surface area of the polyamide based skin layer on the surface of the composite reverse osmosis membrane is 3 or more (wherein the specific surface area of the skin layer is represented by the following formula; The specific surface area of the skin layer=(the surface area of the skin layer)/(the surface area of the microporous support)).

The composite reverse osmosis film is treated with an oxidizing agent and provides a salt rejection of 99% or more and a flux of 1.5 $m^3/m^2 \cdot day$ or more, when evaluated by using a solution having pH 6.5 containing 500 ppm of sodium chloride at an operating pressure of 7.5 $kgf/cm^2$ and a temperature of 25° C.

It is preferable that the polyamide based skin layer includes as aromatic polyamide.

It is preferable that the polyamide based skin layer is essentially total aromatic polyamide which obtained by polycondensation of a compound having two or more reactive aromatic amino and a polyfunctional aromatic acid halide having two or more reactive acid halide.

It is preferable that the mean roughness of the polyamide based skin layer on the surface of the composite reverse osmosis membrane is 10000 nm or less, and more preferably, 1000 nm or less.

The composite reverse osmosis film should be treated with an oxidizing agent. Also in the case where the treatment is not performed with the oxidizing agent, a composite reverse osmosis membrane which satisfies the mean roughness according to the present invention has a high flux. However, it is necessary to perform the treatment with the oxidizing agent in order to obtain a salt rejection of 99% or more and a flux of 1.5 m³/m²·day or more when evaluated by using a solution having pH 6.5 containing 500 ppm of sodium chloride at an operating pressure of 7.5 kgh/cm₂ and a temperature of 25° C.

When evaluated by using a solution having pH 6.5 containing 500 ppm of sodium chloride at an operating pressure of 7.5 kgf/cm² and a temperature of 25° C., the composite reverse osmosis membrane should have a salt rejection of 99% or more and a flux of 1.5 m³/m²·day or more.

With the above-mentioned structure, it is preferable that the mean square roughness of the polyamide based skin layer on the surface of the composite reverse osmosis membrane is 60 nm or more.

It is preferable that the mean square roughness of the polyamide based skin layer on the surface of the composite reverse osmosis membrane is 20000 nm or less, and more preferably, 2000 nm or less.

With the above-mentioned structure, it is preferable that the 10-point mean roughness of the polyamide based skin layer on the surface of the composite reverse osmosis membrane is 280 nm or more. It is preferable that the 10-point mean roughness of the polyamide based skin layer on the surface of the composite reverse osmosis membrane is 50000 nm or less, and more preferably, 10000 nm or less.

Furthermore, it is preferable that the maximum difference of elevation of the polyamide based skin layer on the surface of the composite reverse osmosis membrane is 400 nm or more. It is preferable that the maximum difference of elevation of the polyamide based skin layer on the surface of the composite reverse osmosis membrane is 100000 nm or less, and more preferably, 20000 nm or less.

With the above-mentioned structure, it is preferable that the oxidizing agent is chlorine. In the first stage of chlorine treatment, chlorine is added to the aromatic ring of the aromatic amine. Consequently, the bulkiness of a polymer itself is increased so that the flux can be increased while substantially maintaining the rejection. If the chlorine treatment is excessive, the amide coupling is decomposed so that the rejection is reduced. In the present invention, as long as the conditions for treatment satisfy a salt rejection of 99% or more and a transmission flux of 1.5 m³/m²·day or more obtained when evaluated by using a solution having pH 6.5 containing 500 ppm of sodium chloride at an operating pressure of 7.5 kgf/cm² and a temperature of 25° C., the conditions for the treatment with the oxidizing agent are not restricted. For example, the flat (sheet) membrane is treated for 10 to 100 hrs by using a sodium hypochlorite solution (pH10) containing 100 ppm of free chlorine. However, if the pH is increased, or alkaline earth metal salts, transitional metal salts and the like which have catalytic effects are added, or the treatment temperature is increased, the effects can be promoted so that the treatment can be performed effectively in a shorter time.

The mean roughness is defined by the following formula (1).

Mean roughness: Ra $$Ra = \frac{1}{S}\int_0^a \int_0^b |f(x, y) - z_0| dx dy \quad (1)$$

The mean square roughness is defined by the following formula (2).

Mean square roughness: Rms $$Rms = \left[\frac{1}{S}\int_0^a \int_0^b \{f(x, y) - z_0\}^2 dx dy\right]^{1/2} \quad (2)$$

The mean 10-point roughness is defined by the following.

Mean 10-point roughness: Rz

Wherein difference between a mean value of a fifth elevation of a peak from a maximum elevation and a mean value of a fifth depth of a valley from a maximum depth on the specified face.

The maximum difference of elevation is defined by the following formula (3).

Maximum difference of elevation: PV $$PV = z_{max} - z_{min} \quad (3)$$

Wherein a, b: Lengths of two sides of the specified face (rectangle)

S: Area of the specified face f(x,y): Height on the specified face $z_0$: Mean value of the height on the specified face $$z_0 = \frac{1}{S}\int_0^a \int_0^b f(x, y) dx dy$$

Wherein $z_{max}$: Distance between the reference face and the peak on the specified face $z_{min}$: Distance between the reference face and the valley on the specified face The methods for obtaining the mean roughness, the mean square roughness, the mean 10-point roughness and the maximum difference of elevation are in accordance with a general method for obtaining a roughness.

Examples of measuring equipment are an atomic force microscope (AFM), a frictional force microscope (FFM), a non-contact atomic force microscope (NC-AFM), a tunnel microscope (STM), an electrochemical-atomic force microscope (EC-AFN), a scanning electromicroscope (SEN, FE-SEN), a transmission electron microscope (TEM) and the like. As long as the surface roughness can be measured, any method may be used.

It is preferable that the specific surface area of the polyamide based skin layer formed on the surface of the composite reverse osmosis membrane should be equal to or less than 1000.

The specific surface area of the skin layer used in the present invention is represented by the following formula (4).

The specific surface area of the skin layer=(the surface area of the skin layer)/(the surface area of the microporous support) . . . (4)

The surface area of the skin layer represents that of an opposite face to the face that is in contact with the microporous support, that is, a face on the side which is in contact with a supplied solution. The surface area of the microporous support represents that of a face which is in contact with the skin layer.

Methods for obtaining the surface area and the specific surface area can be found according to general methods for obtaining the surface area and the specific surface area, and are not restricted to particular technique. For example, there are a surface area measuring apparatus, a specific surface area measuring device, a scanning electron microscope (SEM, FE-SEM), a transmission electron microscope (TEM) and the like.

The composite reverse osmosis membrane should be treated with an oxidizing agent. It is necessary to perform the treatment with the oxidizing agent in order to obtain a salt rejection of 99% or more and a flux of 1.5 m$^3$/m$^2$·day or more when evaluated by using a solution having pH 6.5 containing 500 ppm of sodium chloride at an operating pressure of 7.5 kgf/cm$^2$ and a temperature of 25° C.

The performance of the composite reverse osmosis membrane should have a salt rejection of 99% or more and a flux of 1.5 m$^3$/m$^2$·day or more when evaluated by using a solution having pH 6.5 containing 500 ppm of sodium chloride at an operating pressure of 7.5 kgf/cm$^2$ and a temperature of 25° C.

With the above-mentioned structure, it is preferable that the oxidizing agent is chlorine. In the first stage of chlorine treatment, chlorine is added to the aromatic ring of the aromatic amine. Consequently, the bulkiness of a polymer itself is increased so that the flux can be increased while relatively keeping the rejection. If the chlorine treatment becomes strict, the amide coupling is decomposed so that the rejection is reduced. In the present invention, as long as the conditions for treatment satisfy a salt rejection of 99% or more and a transmission flux of 1.5 m$^3$/m$^2$·day or more when evaluated by using a solution having pH 6.5 containing 500 ppm of sodium chloride at an operating pressure of 7.5 kgf/cm$^2$ and a temperature of 25° C., the conditions for the treatment with the oxidizing agent are not restricted. For example, the flat (sheet) membrane is treated for 10 to 100 hrs by using a sodium hypochlorite solution (pH10) containing 100 ppm of free chlorine. However, if pH is increased, or alkaline earth metal salts, transitional metal salts and the like having catalytic effects are added, or the treatment temperature is increased, the effects can be promoted so that the treatment can be performed effectively in a shorter time.

It is preferable that the composite reverse osmosis membrane of this invention is used as a reverse osmosis membrane in a membrane module.

According to the present invention, the highly permeable composite reverse osmosis membrane having a high salt rejection and a high flux performance can be implemented. For example, the replacement of salt water by fresh water can be performed by desalination of brackish water, sea water and the like and ultrapure water necessary for the manufacture of a semiconductor can be produced with less power, less energy, less space and lower costs. Consequently, the composite reverse osmosis membrane can be used suitably. In particular, the composite reverse osmosis membrane can be practically used at a pressure of about 3 kgf/cm$^2$. The pressure is about equal to the pressure of public waterworks for home. The module using the reverse osmosis membrane according to the present invention can be applied to a domestic water purifier without using a pump or the like.

It is preferable in the first and second reverse osmosis membranes that the polyamide based skin layer is essentially total aromatic polyamide. Here, total aromatic polyamide means polyamide which is obtained by polycondensation of an aromatic compound having two or more reactive amino groups and a polyfunctional acid halide aromatic compound having two or more reactive acid halide groups.

The first and second reverse osmosis membranes can be treated with an oxidizing agent while they are still flat sheet membranes. Or the treatment can be carried out after the membranes are assembled into an element, or after they are assembled into a module.

It is preferable that a reverse osmosis membrane module which comprises the first and second reverse osmosis membranes is used. Examples of such a module are a spiral wound type membrane module, an immersed flat sheet type membrane module, a rotary flat sheet type membrane module, and plate-and-frame membrane module. Such an immersed flat sheet type membrane module is disclosed in, for example, Japanese Laid-Open Patent Publication No. 61-129094.

DETAILED DESCRIPTION OF THE INVENTION

The composite reverse osmosis membrane of this invention can be produced by adding at least one compound having a solubility parameter of 8 to 14(cal/cm$^3$)$^{1/2}$ selected from the group consisting of alcohols, ethers, ketones, esters, halogenated hydrocarbons, and sulfur-containing compounds to a system in which a compound having two or more reactive amino groups and a polyfunctional acid halide compound having two or more reactive acid halide groups perform interfacial polycondensation. Namely, a compound having the above-described solubility parameter is added to at least one of the solutions before the interfacial polycondensation is conducted.

The alcohols include, for example, ethanol, propanol, butanol, 1-pentanol, 2-pentanol, t-amyl alcohol, isoamyl alcohol, isobutyl alcohol, isopropyl alcohol, undecanol, 2-ethyl butanol, 2-ethyl hexanol, octanol, cyclohexanol, tetrahydrofurfuryl alcohol, neopentyl glycol, t-butanol, benzyl alcohol, 4-methyl-2-pentanol, 3-methyl-2-butanol, pentyl alcohol, allyl alcohol, ethylene glycol, diethylene glycol, triethylene glycol, and tetraethylene glycol.

The ethers include, for example, anisole, ethyl isoamyl ether, ethyl-t-butyl ether, ethylbenzyl ether, crown ether, cresyl methyl ether, diisoamyl ether, diisopropyl ether, diethyl ether, dioxane, diglycidyl ether, cineol, diphenyl ether, dibutyl ether, dipropyl ether, dibenzyl ether, dimethyl ether, tetrahydropyran, tetrahydrofuran, trioxane, dichloroethyl ether, butyl phenyl ether, furan, methyl-t-butyl ether, monodichlorodiethyl ether, ethylene glycol dimethyl ether, ethylene glycol diethyl ether, ethylene glycol dibutyl ether, ethylene glycol monomethyl ether, ethylene glycol monoethyl ether, ethylene glycol monobutyl ether, diethylene glycol dimethyl ether, diethylene glycol diethyl ether, diethylene glycol dibutyl ether, diethylene glycol monomethyl ether, diethylene glycol monoethyl ether, diethylene glycol monobutyl ether, and diethylene chlorohydrin.

The ketones include, for example, ethyl butyl ketone, diacetone alcohol, diisobutyl ketone, cyclohexanone, 2-heptanone, methyl isobutyl ketone, methyl ethyl ketone, and methyl cyclohexane.

The esters include, for example, methyl formate, ethyl formate, propyl formate, butyl formate, isobutyl formate, isoamyl formate, methyl acetate, ethyl acetate, propyl acetate, butyl acetate, isobutyl acetate, and amyl acetate.

The halogenated hydrocarbons include, for example, allyl chloride, amyl chloride, dichloromethane, and dichloroethane.

The sulfur-containing compounds include, for example, dimethyl sulfoxide, sulfolane, and thiolane. Among these compounds, alcohols and ethers are especially preferable. These compounds can be used either alone or as mixtures thereof.

The amine component used in the present invention is not limited as long as it is a polyfunctional amine having two or more reactive amino groups, for example, aromatic, aliphatic, and alicyclic polyfunctional amines.

The examples of the aromatic polyfunctional amines are, m-phenylenediamine, p-phenylenediamine, 1,3,5-triaminobenzene, 1,2,4-triaminobenzene, 8,5-diaminobenzoic acid, 2,4-diaminotoluene, 2,4-diaminoanisole, amidol, and xylylenediamine. The examples of the aliphatic polyfunctional amines are ethylenediamine, propylenediamine, and tris(2-diaminoethyl)amine. The examples of the alicyclic polyfunctional amines are, 1,3-diaminocyclohexane, 1,2-diaminocyclohexane, 1,4-diaminocyclohexane, piperazine, 2,5-dimethylpiperazine, and 4-aminomethylpiperazine. Those amines can be used alone or as mixtures thereof.

The polyfunctional acid halide used in the present invention is not particularly restricted, and the examples include aromatic, aliphatic, and alicyclic polyfunctional acid halides.

The examples of the aromatic polyfunctional acid halides are trimesic acid chloride, terephthalic acid chloride, isophthalic acid chloride, biphenyldicarboxylic acid chloride, naphthalenedicarboxylic acid dichloride, benzene trisulfonic acid chloride, benzene disulfonic acid chloride, and chlorosulfonium benzene dicarboxylic acid chloride.

The examples of the aliphatic polyfunctional acid halides are propanetricarboxylic acid chloride, butanetricarboxylic acid chloride, pentanetricarboxylic acid chloride, glutaryl halide, and adipoyl halide.

The examples of the alicyclic polyfunctional acid halides are cyclopropanetricarboxylic acid chloride, cyclobutanetetracarboxylic acid chloride, cyclopentanetricarboxylic acid chloride, cyclopentanetetracarboxylic acid chloride, cyclohexanetricarboxylic acid chloride, tetrahydrofurantetracarboxylic acid chloride, cyclopentanedicarboxylic acid chloride, cyclobutanedicarboxylic acid chloride, cyclohexanedicarboxylic acid chloride, and tetrahydrofurandicarboxylic acid chloride.

According to the present invention, a composite reverse osmosis membrane having a skin layer mainly comprising a crosslinked polyamide on a microporous support is obtained by interfacial polymerization of the amine component and the acid halide component.

In the present invention, the microporous support for supporting the thin film is not particularly limited as long as the membrane can be supported, and the examples are polysulfone, polyaryl ether sulfones such as polyether sulfone, polyimide and polyvinylidene fluoride. A microporous supporting film comprising polysulfone or polyaryl ether sulfone is especially preferable because it is stable chemically, mechanically and thermally. Such a microporous support usually has a thickness of about 25 to 125 $\mu$m, and preferably, about 40 to 75 $\mu$m, but the thickness is not necessarily limited to those ranges.

In more detail, the composite reverse osmosis membrane can be obtained by forming a first layer comprising a solution containing the amine component on the microporous support, forming a layer comprising the solution containing the acid halide component on the first layer, and then performing the interfacial polycondensation to form a membrane comprising crosslinked polyamide on the microporous support.

The solution containing polyfunctional amine can contain a small amount of polymers such as polyvinyl alcohol, polyvinyl pyrrolidone, polyacrylic acid, and/or a polyhydric alcohol such as sorbitol or glycerol in order to facilitate the film formation and improve the performance of the composite reverse osmosis membranes.

In order to enhance the flux, a compound having a solubility parameter of 8 to 14 $(cal/cm^3)^{1/2}$ can be added to a solution containing polyfunctional amine or/and a solution containing a halide component.

The amine salts described in Japanese Laid-Open Patent Publication No. 2-187135, such as a salt of a tetraalkylammonium halide or a trialkylamine and an organic acid can also be suitably used for the solution to facilitate the film formation, improve the absorption of the amine solution in the support, and promote the condensation reaction.

The solution can further contain a surfactant such as sodium dodecylbenzenesulfonate, sodium dodecylsulfonate, and sodium laurylsulfonate. Such a surfactant has an effect for improving the wettability of the solution containing the polyfunctional amine for the microporous support.

Furthermore, it is effective to use sodium hydroxide or sodium phosphate (sodium tertiary phosphate $Na_3PO_4$) capable of removing a hydrogen halide formed by the interfacial reaction or to use an acylation catalyst as a catalyst in order to promote the polycondensation reaction at the interface.

The concentration of the acid halide and that of the polyfunctional amine are not particularly limited for the solution containing the acid halide and the solution containing the polyfunctional amine, but the concentration of the acid halide is usually 0.01 to 5 wt %, and preferably 0.05 to 1 wt %. The concentration of the polyfunctional amine is usually 0.1 to 10 wt %, and preferably, 0.5 to 5 wt %.

Thus, the solution containing polyfunctional amine is coated on the microporous support, and the solution containing a polyfunctional acid halide compound is coated thereon. After the extra solutions are removed, the coated layers are heated and dried, usually at a temperature of about 20 to 150° C., preferably about 70 to 130° C., for about 1 to 10 minutes, preferably about 2 to 8 minutes. Thus, the thin film having water permeability formed of crosslinked polyamide is obtained. The thin film usually has a thickness of about 0.05 to 2 $\mu$m, and preferably, about 0.1 to 1 $\mu$m.

Preferred examples of the present invention will be described below in more detail. The present invention is not restricted to the following examples. In the following examples, a mean roughness (Ra) defined by the formula (1), a mean square roughness (Rms) defined by the formula (2), a 10-point mean roughness (Rz) defined by the formula (3) and a maximum difference of elevation (PV) defined by the formula (4) were calculated with values measured by using an atomic force microscope (AFM). The mean roughness (Ra) is obtained by extending, in three dimensions, the mean central line roughness Ra defined by JIS B0601 such that it can be applied to a measured face, and a mean absolute value of deviation from a reference face to a specified face. The measured surface is designated by all measurement data. The specified face is a surface whose roughness should be measured and is designated face. The reference face is represented by $Z=Z_0$ when the mean value of the height of the specified face is represented by $Z_0$. The mean square face roughness (Rms) is obtained by extending Rms with respect to a profile curve in the same manner as Ra such that it can be applied to the measured face, and a square root of the mean square value of the deviation from the reference face to the specified face. The 10-point mean roughness (Rz) is obtained by extending, in three dimensions, Rz defined by JIS B0601, and is a difference between a mean value of a fifth elevation of a peak from a maximum elevation and a mean value of a fifth depth of a valley from a maximum depth on the specified face. A maximum difference in elevation (PV) represents a difference between an altitude Zmax of the peak and a depth Zmin of the deepest valley on the specified face. The above-mentioned measuring method itself has been known well.

A polysulfone-based ultrafiltration membrane was used as a microporous support in the following example.

EXAMPLE 1

An aqueous solution containing 3.0 wt % of m-phenylenediamine, 0.15 wt % of sodium laurylsulfate, 3.0 wt % of triethylamine, 6.0 wt % of camphor sulfonic acid, and 5.0 wt % of isopropyl alcohol was caused to come in contact with a porous polysulfone supporting film for several seconds. Thus, any extra aqueous solution was removed to form a layer of the aqueous solution on the supporting film.

Then, an IP1016 solution (isoparaffin based hydrocarbon oil made by IDEMITSU Chemical Co. Ltd.) containing 0.20 wt % of trimesic acid chloride and 0.05 wt % of isopropyl alcohol was caused to come in contact with the surface of the supporting film, and was thereafter held for 3 mins. in a hot air dryer at a temperature of 120° C. Consequently, a polymeric thin film was formed on the supporting film. Thus, a composite reverse osmosis membrane was obtained.

A part of the composite reverse osmosis membrane was washed in water and dried. Then, the roughness of a polyamide based skin layer on the surface of the composite reverse osmosis membrane was measured by AFM. Consequently, Ra was 110 nm, Rms was 132 nm, Rz was 523 nm, and PV was 652 nm.

The residual composite reverse osmosis membrane was immersed in a sodium hypochlorous acid solution having pH 10 and a free chlorine concentration of 100 ppm at a room temperature for 24 hrs. The composite reverse osmosis membrane was washed. The composite reverse osmosis membrane was evaluated by using a saline solution having pH 6.5 containing 500 ppm of sodium chloride at a pressure of 7.5 kgf/cm$^2$. Consequently, a salt rejection of 99.4% and a flux of 1.5 m$^3$/m$^2$·day were obtained based on a conductivity of a permeable solution. Furthermore, the composite reverse osmosis membrane was evaluated at a pressure of 3 kgf/cm$^2$. Consequently, a salt rejection of 99.3% and a flux of 0.6 m$^3$/m$^2$·day were obtained based on the conductivity of the permeable solution. Moreover, the composite reverse osmosis membrane was evaluated by using a saline solution having pH 6.5 containing 1500 ppm of sodium chloride at a pressure of 15 kgf/cm$^2$. Consequently, a salt rejection of 99.4% and a flux of 3.0 m$^3$/m$^2$·day were obtained based on the conductivity of the permeable solution.

COMPARATIVE EXAMPLE 1

A composite reverse osmosis membrane was obtained in the same manner as in Example 1 except that isopropyl alcohol was not added to an amine solution or an acid chloride organic solution. The roughness of the composite reverse osmosis membrane had Ra of 51 nm, Rms of 62 nm, Rz of 296 nm, and PV of 345 nm. The performance of the composite reverse osmosis membrane was evaluated at a pressure of 7.5 kgf/cm$^2$ by using a saline solution having pH 6.5 containing 500 ppm of sodium chloride. Consequently, a salt rejection of 99.4% and a flux of 0.6 m$^3$/m$^2$·day were obtained.

EXAMPLES 2 AND 3, COMPARATIVE EXAMPLE 2

A composite reverse osmosis membrane was obtained in the same manner as in Example 1 except that the time for immersion in a sodium hypochlorous acid solution was changed. In Comparative Example 2, the composite reverse osmosis membrane is not immersed in the hypochlorous acid solution. Accordingly, the composite reverse osmosis membrane is not treated with an oxidizing agent. The result is shown in Table 1.

EXAMPLE 4

A composite reverse osmosis membrane was obtained in the same manner as in Example 1 except that the pH of the sodium hypochlorous acid solution was changed. The result is shown in Table 1.

EXAMPLE 5

A composite reverse osmosis membrane was obtained in the same manner as in Example 1 except that calcium chloride was added to the sodium hypochlorous acid solution. The result is shown in Table 1.

TABLE 1

| | Sodium hypochlorite solution | | Dipping | 500 ppm NaCl solution evaluation (7.5 kgf/cm$^2$) | |
|---|---|---|---|---|---|
| | pH | Additive (ppm) | time (hr) | Salt rejection (%) | Flux (m$^3$/m$^2$ · day) |
| Ex2 | 10 | None | 50 | 99.1 | 1.9 |
| Ex3 | 10 | None | 62 | 99.0 | 2.0 |
| Ex4 | 11 | None | 24 | 99.3 | 1.7 |
| Ex5 | 10 | Calcium chloride 1000 | 24 | 99.0 | 2.1 |
| CoEx2 | 10 | None | 0 | 99.5 | 1.0 |

* Ex . . . Example
* CoEx . . . Comparative Example

As is apparent from Table 1, the composite reverse osmosis membrane according to the present example had a high salt rejection and high flux performance. In particular, it was confirmed that the composite reverse osmosis membrane can practically be used at a pressure of about 3 kgf/cm$^2$.

EXAMPLE 6

An aqueous solution containing 3.0 wt % of m-phenylenediamine, 0.15 wt % of sodium laurylsulfate, 3.0 wt % of triethylamine, 6.0 wt % of camphor sulfonic acid, and 5.0 wt % of isopropyl alcohol was caused to come in contact with a porous polysulfone supporting film for several seconds. Thus, any extra aqueous solution is removed to form a layer of the aqueous solution on a supporting film.

Then, a hexane solution containing 0.20 wt % of trimesic acid chloride was caused to come in contact with the surface of the supporting film, and was thereafter held for 3 mins. in a hot air dryer at a temperature of 120° C. Consequently, a polymeric thin film was formed on the supporting film. Thus, a composite reverse osmosis membrane was obtained.

A part of the composite reverse osmosis membrane was washed by water and dried. Then, a section of the composite reverse osmosis membrane was analyzed by TEM. The specific surface area of the polyamide based skin layer was measured. The specific surface area was 4.0.

The residual composite reverse osmosis membrane was immersed in a sodium hypochlorous acid solution having pH 10 and a free chlorine concentration of 100 ppm at a room temperature for 24 hrs. The composite reverse osmosis membrane was washed.

The composite reverse osmosis membrane was evaluated by using a saline solution having pH 6.5 containing 500 ppm of sodium chloride at a pressure of 7.5 kgf/cm². Consequently, a salt rejection of 99.3% and a flux of 1.6 m³/m²·day were obtained based on a conductivity of a permeable solution. Furthermore, the composite reverse osmosis membrane was evaluated at a pressure of 3 kgf/cm². Consequently, a salt rejection of 99.2% and a flux of 0.6 m³/m²·day were obtained based on the conductivity of the permeable solution. Moreover, the composite reverse osmosis membrane was evaluated by using a saline solution having pH 6.5 containing 1500 ppm of sodium chloride at a pressure of 15 kgf/cm². Consequently, a salt rejection of 99.4% and a flux of 3.1 m³/m²·day were obtained based on the conductivity of the permeable solution.

COMPARATIVE EXAMPLE 3

A composite reverse osmosis membrane was obtained in the same manner as in Example 6 except that isopropyl alcohol was not added to an amine solution and an acid chloride organic solution. The specific surface area of the composite reverse osmosis membrane was 2.1. The performance of the composite reverse osmosis membrane was evaluated at a pressure of 7.5 kgf/cm² by using a saline solution having pH 6.5 containing 500 ppm of sodium chloride. Consequently, a salt rejection of 99.3% and a flux of 0.6 m³/m²·day were obtained.

EXAMPLE 7, COMPARATIVE EXAMPLE 4

A composite reverse osmosis membrane was obtained in the same manner as in Example 6 except that the time for immersion in a sodium hypochlorous acid solution was changed. The result is shown in Table 2.

As a comparative example 4, a salt rejection and a flux of a membrane which is not treated with chlorine were measured, i.e. without the immersion in the sodium hypochlorous acid solution. The result is shown in Table 2.

EXAMPLE 8

A composite reverse osmosis membrane was obtained in the same manner as in Example 6 except that the pH of the sodium hypochlorous acid solution was changed. The result is shown in Table 2.

EXAMPLE 9

A composite reverse osmosis membrane was obtained in the same manner as in Example 6 except that calcium chloride was added to the sodium hypochlorous acid solution. The result is shown in Table 2.

TABLE 2

|  | Sodium hypochloride solution | | Dipping | 500 ppm NaCl solution evaluation (7.5 kgf/cm²) | |
| --- | --- | --- | --- | --- | --- |
|  | pH | Additive (ppm) | time (hr) | Salt rejection (%) | Flux (m³/m² · day) |
| Ex7 | 10 | None | 50 | 99.0 | 2.0 |
| Ex8 | 11 | None | 24 | 99.2 | 1.8 |
| Ex9 | 10 | Calcium chloride 1000 | 24 | 99.0 | 2.3 |
| CoEx4 | 10 | None | 0 | 99.4 | 1.1 |

* Ex . . . Example
* CoEx . . . Comparative Example

As is apparent from Table 2, the present example could provide a reverse osmosis membrane which keeps a high salt rejection and a high flux performance. In particular, it was confirmed that the reverse osmosis membrane can be practically used at a low pressure of about 3 kgf/cm².

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A high permeable composite reverse osmosis membrane comprising:
    a thin film:
    a microporous support for supporting the thin film,
    wherein the thin film is a polyamide based skin layer obtained by polycondensation of a compound having two or more reactive amino groups and a polyfunctional acid halide having two or more reactive amino groups,
    a roughness of the polyamide based skin layer on the surface of said composite reverse osmosis membrane is 50 nm or more,
    said composite reverse osmosis film being immersed in with an oxidizing agent so as to provide a salt rejection of 99% or more and a flux of 1.5 m³/m²·day or more, when evaluated by using a solution having pH 6.5 containing 500 ppm of sodium chloride at an operating pressure of 7.5 kgf/cm² and a temperature of 25° C., and wherein said composite reverse osmosis membrane can be used at a pressure of about 3 kgf/cm².

2. The high permeable composite reverse osmosis membrane as defined in claim 1, wherein the polyamide based skin layer is aromatic polyamide.

3. The high permeable composite reverse osmosis membrane as defined in claim 1, wherein the polyamide based skin layer is essentially total aromatic polyamide.

4. The high permeable composite reverse osmosis membrane as defined in claim 1, wherein the polyamide based skin layer on the surface of the composite reverse osmosis membrane has a mean square roughness of 60 nm or more.

5. The high permeable composite reverse osmosis membrane as defined in claim 1, wherein the polyamide based skin layer on the surface of the composite reverse osmosis membrane has a 10-point roughness of 280 nm or more.

6. The high permeable composite reverse osmosis membrane as defined in claim 1, wherein the polyamide based skin layer on the surface of the composite reverse osmosis membrane has a maximum difference of elevation of 400 nm or more.

7. The high permeable composite reverse osmosis membrane as defined in claim 1, wherein the oxidizing agent is chlorine.

8. The high permeable composite reverse osmosis membrane as defined in claim 1, wherein oxidizing treatment is carried out while the membrane is in the state selected from the group consisting of a flat sheet state, a state after being assembled into an element, and a state after being assembled into a module.

9. A reverse osmosis membrane module comprising the high permeable composite reverse osmosis membrane according to claim 1.

10. The high permeable composite reverse osmosis membrane as defined in claim 9, wherein the module is at least one selected from the group consisting of a spiral wound type membrane module, an immersed flat sheet type membrane module, a rotary flat sheet type membrane module, and a plate-and-frame membrane module.

11. A high permeable composite reverse osmosis membrane comprising:

a thin film:

a microporous support for supporting the thin film, wherein the thin film is a polyamide based skin layer obtained by polycondensation of a compound having two or more reactive amino groups and a polyfunctional acid halide having two or more reactive amino groups, a specific surface area of the polyamide based skin layer on the surface of said composite reverse osmosis membrane is 3 or more, wherein the specific surface area of the skin layer is represented by the following formula:

the specific surface area of the skin layer=(the surface area of the skin layer)/(the surface area of the microporous support), said composite reverse osmosis film being immersed in an oxidizing agent so as to provide a salt rejection of 99% or more and a flux of 1.5 m$^3$/m$^2$·day or more, when evaluated by using a solution having pH 6.5 containing 500 ppm of sodium chloride at an operating pressure of 7.5 kgf/cm$^2$ and a temperature of 25° C., and wherein said composite reverse osmosis membrane can be used at a pressure of about 3 kgf/cm$^2$.

12. The high permeable composite reverse osmosis membrane as defined in claim 11, wherein the specific surface area of the polyamide based skin layer formed on the surface of the composite reverse osmosis membrane is 1000 or less.

13. The high permeable composite reverse osmosis membrane as defined in claim 11, wherein the oxidizing agent is chlorine.

14. The high permeable composite reverse osmosis membrane as defined in claim 11, wherein the polyamide based skin layer is aromatic polyamide.

15. The high permeable composite reverse osmosis membrane as defined in claim 11, wherein the polyamide based skin layer is essentially total aromatic polyamide.

16. The high permeable composite reverse osmosis membrane as defined in claim 11, wherein oxidizing treatment is carried out while the membrane is in the state selected from the group consisting of a flat sheet state, a state after being assembled into an element, and a state after being assembled into a module.

17. A reverse osmosis membrane module comprising the high permeable composite reverse osmosis membrane according to claim 11.

18. The high permeable composite reverse osmosis membrane as defined in claim 17, wherein the module is at least one selected from the group consisting of a spiral wound type membrane module, an immersed flat sheet type membrane module, a rotary flat sheet type membrane module, and a plate-and-frame membrane module.

19. A method for purifying low pressure domestic water; said method comprising directing a domestic water supply to a high permeable composite reverse osmosis membrane; wherein the high permeable composite reverse osmosis membrane comprises:

a thin film; and a microporous support for supporting the thin film, wherein the thin film is a polyamide based skin layer obtained by polycondensation of a compound having two or more reactive amino groups and a polyfunctional acid halide having two or more reactive amino groups, has a roughness of 50 nm or more, and wherein said composite reverse osmosis film is treated with an oxidizing agent to enhance its low pressure performance.

20. The method for purifying low pressure domestic water as defined in claim 19, wherein the polyamide based skin layer is aromatic polyamide.

21. The method for purifying low pressure domestic water as defined in claim 19, wherein the polyamide based skin layer on the surface of the composite reverse osmosis membrane has a mean square roughness of 60 nm or more.

22. The method for purifying low pressure domestic water as defined in claim 19, wherein the polyamide based skin layer on the surface of the composite reverse osmosis membrane has a 10-point roughness of 280 nm or more.

23. The method for purifying low pressure domestic water as defined in claim 19, wherein the polyamide based skin layer on the surface of the composite reverse osmosis membrane has a maximum difference of elevation of 400 nm or more.

24. The method for purifying low pressure domestic water as defined in claim 19, wherein the oxidizing agent comprises chlorine.

25. The method for purifying low pressure domestic water as defined in claim 19, wherein treatment with the oxidizing agent results in a membrane with a salt rejection of 99% or more and a flux of 0.6 m$^3$/m$^2$·day or more, when evaluated by using a solution having pH 6.5 containing 500 ppm of sodium chloride at an operating pressure of 3 kgf/cm$^2$ and a temperature of 25° C.

26. The method for purifying low pressure domestic water as defined in claim 19, wherein the domestic water supply is directed to the high permeable composite reverse osmosis membrane without the use of additional pressurization.

27. An apparatus for purifying low pressure domestic water; said apparatus comprising a high permeable composite reverse osmosis membrane comprising:

a thin film; and a microporous support for supporting the thin film, wherein the thin film is a polyamide based skin layer obtained by polycondensation of a compound having two or more reactive amino groups and a polyfunctional acid halide having two or more reactive amino groups, has a roughness of 50 nm or more, and wherein said composite reverse osmosis film is treated with an oxidizing agent to enhance its low pressure performance, with low pressure domestic water being directly supplied to the membrane.

28. The apparatus for purifying low pressure domestic water as defined in claim 27, wherein the polyamide based skin layer is aromatic polyamide.

29. The apparatus for purifying low pressure domestic water as defined in claim 27, wherein the polyamide based skin layer on the surface of the composite reverse osmosis membrane has a mean square roughness of 60 nm or more.

30. The apparatus for purifying low pressure domestic water as defined in claim 27, wherein the polyamide based skin layer on the surface of the composite reverse osmosis membrane has a 10-point roughness of 280 nm or more.

31. The apparatus for purifying low pressure domestic water as defined in claim 27, wherein the polyamide based skin layer on the surface of the composite reverse osmosis membrane has a maximum difference of elevation of 400 nm or more.

32. The apparatus for purifying low pressure domestic water as defined in claim 27, wherein the oxidizing agent comprises chlorine.

33. The apparatus for purifying low pressure domestic water as defined in claim 27, wherein treatment with the oxidizing agent results in a membrane with a salt rejection of 99% or more and a flux of 0.6 $m^3/m^2$·day or more, when evaluated by using a solution having pH 6.5 containing 500 ppm of sodium chloride at an operating pressure of 3 $kgf/cm^2$ and a temperature of 25° C.

34. The apparatus for purifying low pressure domestic water as defined in claim 27, wherein the apparatus is adapted to direct water from a domestic water supply directed to the high permeable composite reverse osmosis membrane without the use of additional pressurization.

* * * * *